April 25, 1950        J. W. PICKING        2,505,688

LINEAR VOLTAGE GENERATOR

Filed July 24, 1946

INVENTOR.

BY Jay W. Picking

Harding and Krost
attys.

Patented Apr. 25, 1950

2,505,688

UNITED STATES PATENT OFFICE 2,505,688

LINEAR VOLTAGE GENERATOR

Jay W. Picking, Cleveland, Ohio, assignor to The Reliance Electric & Engineering Company, a corporation of Ohio Application July 24, 1946, Serial No. 685,947

21 Claims. (Cl. 320—1)

My invention relates in general to electrical circuits to provide a constant current or a voltage which will increase and decrease linearly.

An object of my invention is an electrical circuit to provide a constant current or a voltage which will increase and decrease linearly at a definite predeterminable adjustable rate to any predeterminable adjustable value.

Another object of my invention is an electrical circuit which will provide a constant current or a voltage which will increase at an essentially linear rate to any predeterminable adjustable value.

Another object of my invention is an electrical circuit to provide a constant current or a voltage which will decrease at an essentially linear rate to any predeterminable adjustable value.

Figure 1:
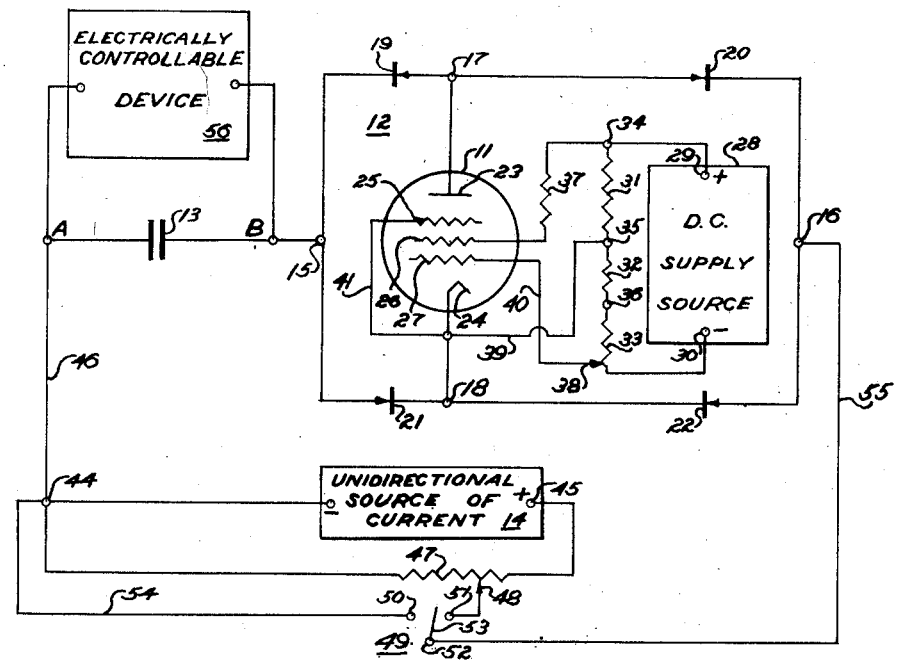
Figure 2:
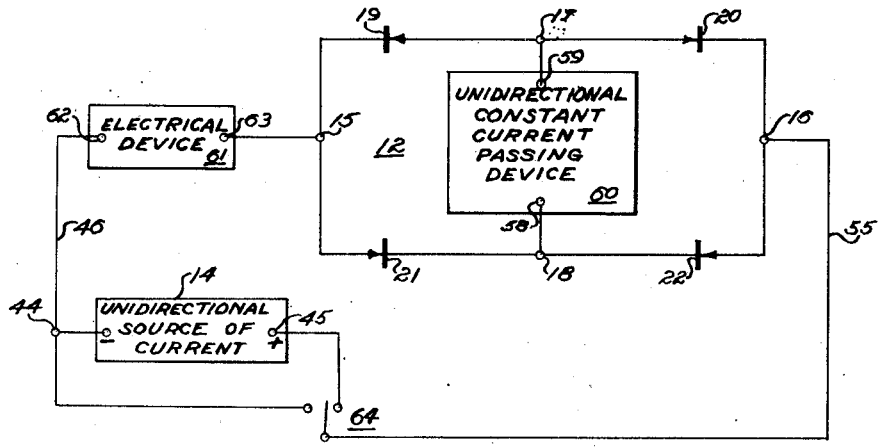

Other objects and a fuller understanding of my invention may be had by referring to the following description and claims, taken in conjunction with the accompanying drawing, in which:

Figure 1 shows the preferred form of my invention wherein the linearly variable voltage appears across the points A and B, which is being applied to an electrically controllable device; and Figure 2 shows a modified form of my invention, wherein the linearly variable voltage appears across the electrical device at terminals 62 and 63.

In various control schemes it is common practice to use the combination of a condenser and a resistor to provide a voltage which can be used to increase or decrease in a predetermined time. However, the rate is not linear. The change of voltage with respect to time for this type of circuit is an exponential function. In many cases it is desirable to have the rate of voltage change linear and constant. A pentode thermionic tube has frequently been used as the resistor in a resistor-condenser combination. The constant current characteristic of this type of tube modifies the exponential characteristic to one which is essentially linear. A disadvantage of this system is that the thermionic tube can pass current in one direction only and therefore the voltage across the condenser can be caused to rise, but it cannot be reduced through the same circuit. My invention makes use of the combination of a condenser and a pentode thermionic tube and provides for both charging and discharging the condenser by adding to the combination a bridge rectifier so that current can flow to and from the condenser but pass through the pentode thermionic tube in one direction only. In reference to Figure 1, my invention comprises a bridge rectifier 12 having input and output terminals, a thermionic pentode tube 11 across the output terminals of the bridge rectifier 12, a condenser 13 and a unidirectional source of current 14, the condenser 13 and the unidirectional source of current 14 being disposed in series circuit relationship across the input terminals of the bridge rectifier 12. An electrically controllable device 56 is shown connected across the terminals A and B of the condenser 13. More specifically, the bridge rectifier has a first input terminal 15 and a second input terminal 16, and a first output terminal 17 and a second output terminal 18. The bridge rectifier has first, second, third and fourth unidirectional current passing devices with reference numbers 19, 20, 21 and 22 respectively. In this description, current will be assumed to flow in the direction of the electron flow. The first unidirectional current passing device 19 is connected to pass electron current from the first output terminal 17 to the first input terminal 15; the second unidirectional current passing device 20 is connected to pass electron current from the first output terminal 17 to the second input terminal 16; the third unidirectional current passing device 21 is connected to pass electron current from the first input terminal 15 to the second output terminal 18; and the fourth unidirectional current passing device 22 is connected to pass electron current from the second input terminal 16 to the second output terminal 18. The thermionic pentode tube 11 has a cathode 24, an anode 23, a control grid 27, a screen grid 26, and a suppressor grid 25. The anode 23 of the thermionic pentode tube 11 is connected to the first output terminal 17 of the bridge rectifier 12, and the cathode 24 of the thermionic pentode tube 11 is connected to the second output terminal 18 of the bridge rectifier 12. A D. C. supply source 28 supplies direct current potential to the screen grid 26 of the control grid 27 of the thermionic pentode tube 11. The D. C. supply source 28 has a positive terminal 29 and a negative terminal 30. Connected across these terminals of the D. C. supply source 28 is a screen grid potential resistor 31, a control grid potential limiting resistor 32 and a control grid potentiometer 33 in series. A connection 34 connects the positive end of the screen grid potential resistor 31 to the positive terminal 29 of the D. C. supply source 28. A connection 35 connects the negative end of the screen grid potential resistor 31 to the positive end of the control grid potential limiting resistor 32. A connection 36 connects the positive end of the control grid potentiometer 33 to the negative end of the control grid potential limiting resistor 32. The negative end of the control grid potentiometer 33 is connected to the negative terminal 30 of the D. C. supply source 28. The screen grid potential which appears at the positive terminal 29 of the D. C. supply source 28 and at the connection 34 is applied to the screen 26 of the thermionic pentode tube 11 through the current limiting resistor 37. The cathode 24 of the thermionic pentode tube 11 is connected through conductor 39 to the connection 35 between the resistors 31 and 32, to provide the reference voltage for the cathode. The control grid 27 is connected through conductor 40 to the movable finger 38 on the potentiometer 33, to provide a variable negative voltage on the control grid 27 with respect to the cathode 24 of the thermionic pentode tube 11. The control grid potential limiting resistor 32 prevents the negative potential of the control grid 27 with respect to the cathode 24 from becoming too small a value. The suppressor grid 25 is connected through a conductor 41 to the cathode 24.

The condenser 13 has a first terminal A and a second terminal B. The second terminal B is connected to the first input terminal 15 of the bridge rectifier 12. The unidirectional source of current 14 has a negative terminal 44 and a positive terminal 45. The first terminal A of the condenser 13 is connected to the negative terminal 44 of the unidirectional source of current 14 through a conductor 46. A potentiometer 47 is connected across the terminals 44 and 45 of the unidirectional source of current 14. A single pole double throw switch 49 is connected to either include or exclude the unidirectional source of current 14 from the series circuit arrangement and has a first connection 50, a second connection 51, a common connection 52 and a contact member 53. A movable finger 48 of the potentiometer 47 is connected to the second connection 51 of the switch 49. A conductor 54 connects the negative terminal 44 of the unidirectional source of current 14 and the first connection 50 of the switch 49. A conductor 55 connects the common connection 52 of the switch 49 and the second input terminal 16 of the bridge rectifier 12.

In practice, the circuit operation will start when the switch is thrown so the contact member 53 connects the second connection 51 to the common connection 52 of the switch 49. The potential of the unidirectional source of current 14 will cause electron current to flow from the negative terminal 44 through conductor 46 to the first terminal A of condenser 13, through the condenser 13 to the second terminal B thereof, then to the first input terminal 15 of the bridge rectifier 12, through the third unidirectional current passing device 21 to the second output terminal 18, then to the cathode 24 and the anode 23 of the thermionic pentode tube 11, then to the first output terminal 17, through the second unidirectional current passing device 20 to the second input terminal 16 of the bridge rectifier 12, through the conductor 55, the common connection 52, the contact member 53 and the second connection 51 of the switch 49, the movable finger 48, a part of the potentiometer 47, returning to the positive terminal 45 of the unidirectional source of current 14. This flow of current from the unidirectional source of current through the bridge rectifier 12, thermionic pentode tube 11, and the condenser 13 in series will cause the condenser 13 to be charged. As the condenser 13 is charged, the voltage across this condenser will rise, and this rising voltage will be in opposition to the voltage of the unidirectional source of current 14, which will lower the potential applied across the anode and cathode of the thermionic pentode tube 11. The voltage across the condenser 13 will continue to rise and the voltage across the tube 11 will continue to decrease until the condenser 13 has been charged to a potential equal to the potential setting of the potentiometer 47. This potential setting can be varied by the movable finger 48 from any value from zero up to the maximum potential of the unidirectional source of current 14. The signal voltage which this electrical circuit produces will appear across the terminals A and B of the condenser 13, and therefore this signal voltage may be adjusted to any predetermined value by adjusting the movable finger 48 of the potentiometer 47.

A characteristic of a pentode thermionic tube is that it will conduct essentially constant current regardless of the potential impressed between the anode and the cathode of the tube. In this circuit, the voltage impressed between the anode and the cathode of the tube varies from the maximum setting of the movable finger 48 of the potentiometer 47 at the start of the cycle of operation to a zero potential at the end of this cycle of operation, which potential change is the inverse of that potential appearing across the terminals A and B of the condenser 13. Because of this essentially constant current conducting characteristic of the thermionic pentode tube, the condenser 13 will be charged at an essentially linear rate to the predeterminable adjustable value.

The rate at which the thermionic pentode tube will pass current is regulatable by the setting of the movable finger 38 of the potentiometer 33, which varies the negative potential of the control grid 27 with respect to the cathode 24. As the movable finger 38 is moved toward the connection 36, the potential of the control grid 27 is made less negative with respect to the cathode 24, and therefore the tube 11 will pass a greater amount of current. Conversely, as the control grid 27 is made more negative with respect to the cathode 24 by moving the movable finger 38 closer to the negative terminal 30 of the D. C. supply source 28, the tube 11 will conduct less current. This function allows the time rate at which the condenser 13 is to be charged to its predetermined setting to be adjusted at will, which means that changing the position of the movable finger 38 varies the slope of the time versus voltage curve for this cycle of operation of this electrical circuit.

Now, when the contact member 53 of the switch 49 connects the first connection 50 to the common connection 52 of the switch 49, the unidirectional source of current 14 is excluded from the circuit, and the condenser 13 will start to discharge through the bridge circuit and pentode thermionic tube 11. In this case, the electron or current flow is from the first terminal A of the condenser 13 which will be the negative terminal, then through the conductor 46 and 54 to the first connection 50, the contact member 53 and the common connection 52 of the switch 49, through the conductor 55 to the second input terminal 16 of the bridge rectifier 12, then through the fourth unidirectional current passing device 22 to the second output terminal 18 of the bridge rectifier 12, then through the cathode 24 and anode 23 of the thermionic pentode tube 11 to the first output terminal 17 of the bridge rectifier 12, then through the first unidirectional current passing device 19 to the first input terminal 15 of the bridge rectifier 12, and thence return to the second or positive terminal B of the condenser 13. The thermionic pentode tube 11 acts in the same manner as it did during the charging of the condenser 13, in that it passes a constant current. As hereinbefore noted, the rate at which the thermionic pentode tube 11 will pass current is determined by the setting of the movable finger 38 on the potentiometer 33. This setting again serves the function of determining the time rate of discharge of the condenser 13. As the condenser 13 discharges, the potential impressed across the anode and cathode of the thermionic pentode 11 will decrease as a function of the time. However, this decrease in the applied potential across the anode and cathode of the tube 11 will not materially vary the rate of current conducting of the tube due to the characteristic of the pentode thermionic tube.

This electrical circuit, therefore, will then provide a voltage signal which appears at the terminals A and B of the condenser 13 which will increase linearly at a definite predeterminable adjustable rate to any predeterminable adjustable value, and decrease linearly at a definite predeterminable adjustable rate to any predeterminable adjustable value. An electrically controllable device 56 is shown connected across the terminals A and B of the condenser B to utilize the voltage.

In Figure 2, the bridge rectifier 12 is identical with the bridge rectifier 12 in Figures 1 and 2. Across the output terminals 17 and 18 of the bridge rectifier 12 is connected a unidirectional constant current passing device 60, having an input terminal 58 and an output terminal 59. The input terminal 58 and the output terminal 59 are connected to the output terminals 18 and 17 respectively of the bridge rectifier 12. The device 60 therefore passes current from the second output terminal 18 to the first output terminal 17. The unidirectional constant current passing device 60 may be an electronic tube or any other electrical device possessing this characteristic. An electrical device 61 having a first terminal 62 and a second terminal 63 has the second terminal 63 connected to the first input terminal 15 of the bridge rectifier 12, and the first terminal 62 connected through conductor 46 to the negative terminal 44 of the unidirectional source of current 14. The unidirectional source of current 14, having a negative terminal 44 and a positive terminal 45, is identical with the unidirectional source of current 14 in Figures 1 and 2. Switch means or connection means 64 are provided to connect the conductor 55 either to the positive terminal 45 or the negative terminal 44 of the unidirectional source of current 14. The operation of this circuit is the same as for Figure 1. Passage of current through the electrical device 61 will cause a voltage drop across this electrical device 61 in proportion to the impedance thereof. An electrically controllable device 56 may be connected in parallel across the terminals 62 and 63 of the electrical device 61, as shown in Figure 1, in order to use the signal voltage developed across the terminals 62 and 63 of the electrical device 61. The electrical device 61 may be an electrical energy storing device, for which case the connection means 64 is provided to exclude the unidirectional source of current 14 from the series circuit arrangement, in which case the electrical energy storing device will release its stored energy through the bridge rectifier 12 to the unidirectional constant current passing device 60 connected across the output terminals of the bridge rectifier 12. This passage of current would be analogous to the passage of current from the discharge of the condenser in Figure 1, and would result in an essentially linear voltage change across the electrical device 61, due to the constant current flowing in the circuit.

The electrical device 61 may also be any device that utilizes a constant current regardless of variations in the applied potential, rather than using the voltage developed across the electrical device to be applied to an electrically controllable device.

Any rate of change in the setting of the potentiometer 47 in excess of the rate of voltage change allowed across the condenser 13, by the setting of the potentiometer 33, will act the same as throwing the switch 49.

Although I have described by invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. An electrical circuit for supplying a voltage comprising, in combination, a bridge rectifier having two input and two output terminals, a thermionic tube having at least two elements, the said two elements being connected across the said output terminals of the said bridge rectifier, a condenser, a unidirectional source of current, and electrical connection means for connecting the said unidirectional source of current and the said condenser in series circuit arrangement with the said input terminals of the said bridge rectifier.

2. An electrical circuit for supplying a voltage comprising, in combination, a bridge rectifier having two input and two output terminals, a thermionic tube having at least two elements, the said two elements being connected across the said output terminals of the said bridge rectifier, a condenser, a unidirectional source of current, first disengageable electrical connection means for connecting the said unidirectional source of current and the said condenser in series circuit arrangement with the said input terminals of the said bridge rectifier and second disengageable electrical connection means for connecting the said condenser in series circuit arrangement with the said input terminals of the said bridge rectifier.

3. An electrical circuit comprising, in combination, a bridge rectifier having two input and two output terminals, a thermionic tube having an anode and a cathode, said anode and said cathode being connected across the said output terminals of the said bridge rectifier, a condenser, a variable unidirectional source of current, first disengageable electrical connection means for connecting the said variable unidirectional source of current and the said condenser in series circuit arrangement with the said input terminals of the said bridge rectifier to change the said condenser to any adjustable value, and second disengageable electrical connection means for connecting the said condenser in series circuit arrangement with the said input terminals of the said bridge rectifier to discharge the said condenser.

4. An electrical circuit comprising, in combination, a bridge rectifier having first and second input terminals and first and second output terminals, a thermionic tube having at least an anode and a cathode, an electrical energy storage device, a unidirectional source of current, first connection means for connecting the said anode and the said cathode of the said thermionic tube to the first and second output terminals respectively of the said bridge rectifier, first disengageable electrical connection means for connecting in series circuit arrangement the said input terminals of the said bridge rectifier, the said electrical energy storage device, and the said unidirectional source of current, and second disengageable electrical connection means for connecting in series circuit arrangement the said input terminals of the said bridge rectifier and the said electrical energy storage device.

5. An electrical circuit comprising, in combination, a bridge rectifier having two input and two-output terminals, a unidirectional constant current passing device connected between the two output terminals of the bridge rectifier, an electrical energy storage device, a unidirectional source of current, and electrical connection means for connecting the said input terminals of the said bridge rectifier in series circuit relationship with the said unidirectional source of current and the said electrical energy storage device.

6. An electrical circuit comprising, in combination, a bridge rectifier having two input and two output terminals, a unidirectional constant current passing device connected between the two output terminals of the bridge rectifier, an electrical energy storage device, a unidirectional source of current, first disengageable electrical connection means for connecting the said input terminals of the said bridge rectifier in series circuit relationship with the said unidirectional source of current and the said electrical energy storage device, and second disengageable electrical connection means for connecting the said input terminals of the said bridge rectifier in series circuit relationship with the said electrical energy storage device.

7. An electrical circuit comprising, in combination, a bridge rectifier having first and second input and first and second output connections, said bridge rectifier having first, second, third and fourth unidirectional current passing devices, first connection means for connecting the said first unidirection current passing device between the first output connection and the first input connection to pass current from the former to the latter, second connection means for connecting the said second unidirectional current passing device between the first output connection and the second input connection to pass current from the former to the latter, third connection means for connecting the said third unidirectional current passing device between the first input connection and the second output connection to pass current from the former to the latter, fourth connection means for connecting the fourth unidirectional current passing device between the second input connection and the second output connection to pass current from the former to the latter, a thermionic tube having a cathode, an anode, a control grid, and an essentially constant current conducting characteristic despite varying anode-cathode potentials, the said cathode being connected to the said second output connection of the said bridge rectifier, and the said anode being connected to the said first output connection of the said bridge rectifier, variable D. C. supply source for biasing the said control grid with respect to the said cathode, an electrical energy storage device, a variable unidirectional source of current having a first and a second terminal, first disengageable connection means for connecting the said input terminals of the said bridge rectifier in series circuit arrangement with the said variable unidirectional source of current and the said electrical energy storage device, and second disengageable connection means for connecting the said input terminals of the said bridge rectifier in series circuit arrangement with the said electrical energy storage device.

8. An electrical circuit for supplying an essentially linearly predeterminably variable voltage to an electrically controllable device, said electrical circuit comprising, in combination, a bridge rectifier having two input and two output terminals, a thermionic tube having an anode, cathode and a control grid and having an essentially constant current conducting characteristic despite variations in the potential difference between the anode and the cathode, the said anode and the said cathode of the said thermionic tube being connected across the said output terminals of the said bridge rectifier, predeterminably adjustable biasing means for varying the potential difference between the said cathode and the said control grid, an electrical energy storing device, a unidirectional variable source of current, first disengageable electrical connection means for connecting the said unidirectional variable source of current in series circuit arrangement with the said electrical energy storing device and the said input terminals of the said bridge rectifier to store electrical energy in the said electrical energy storing device at a predeterminable adjustable essentially linear rate to a predeterminable adjustable value, and second disengageable electrical connection means for connecting the said electrical energy storing device in series circuit arrangement with the said input terminals of the said bridge rectifier to release the stored electrical energy in the said electrical energy storing device at a predeterminable adjustable essentially linear rate, the said electrically controllable device being connected in parallel circuit arrangement with the said electrical energy storing device.

9. An electrical circuit for supplying an essentially constant current to an electrical device, said electrical circuit comprising, in combination, a bridge rectifier having two input and two output terminals, a unidirectional constant current passing device connected between the two output terminals of the bridge rectifier, a unidirectional source of current, and electrical connection means for connecting the said electrical device in series circuit arrangement with the two input terminals of the said bridge rectifier and the said unidirectional source of current.

10. An electrical circuit for supplying an essentially linearly variable voltage across two output terminals thereof, said electrical circuit comprising, in combination, a unidirectional variable source of current, a bridge rectifier having two input and two output terminals, a thermionic tube having an anode, a cathode, a control grid, a screen grid, and a suppressor grid, the said anode and the said cathode of the said thermionic tube being connected across the said two output terminals of the said bridge rectifier, an electrical energy storing device, a D. C. supply source having a positive, a negative and an intermediate terminal, first connection means for connecting the positive terminal of the said D. C. supply source to the said screen grid of the said thermionic tube, second connection means for connecting the said negative terminal of the said D. C. supply source to the control grid of the said thermionic tube, third connection means for connecting the said intermediate terminal of the said D. C. supply source to the said cathode of the said thermionic tube, adjustable biasing means for varying the potential difference between the said cathode and the said control grid, fourth connection means for connecting the said suppressor grid to the said cathode of the said thermionic tube, first disengageable connection means for connecting the said unidirectional variable source of current in series circu't arrangement with the said electrical energy storing device and the said input terminals of the said bridge rectifier and second disengageable connection means for connecting the said electrical energy storing device in series circuit relationship with the said input terminals of the said bridge rectifier, the said output terminals of the said essentially linearly variable voltage generating circuit being across the said electrical energy storing device.

11. An electrical circuit comprising, an electrical energy storage device, a substantially constant current passing device, a substantially unidirectional impedance, and electrical connection means for connecting the aforesaid elements in series for discharging the stored energy in said electrical energy storage device at a substantially constant rate.

12. An electrical circuit comprising, an electrical device, a source of voltage, a substantially constant current passing device, unidirectional current passing means, and electrical connection means for connecting the aforesaid elements in series for conducting current to said electrical device at a substantially constant rate.

13. An electrical circuit comprising, an electrical energy storing device, a source of unidirectional voltage, a substantially constant current passing device, first unidirectional current passing means, electrical connection means for connecting the aforesaid elements in series for storing energy in said electrical energy storing device at a substantially constant rate, second unidirectional current passing means, and electrical connection means for connecting in series said electrical energy storing device, said substantially constant current passing device and said second unidirectional current passing means to release the stored energy in said electrical energy storing device at a substantially constant rate.

14. An electrical circuit comprising, an electrical energy storing device, a source of unidirectional voltage, a substantially constant current passing device, unidirectional current passing means, electrical connection means including switch means for selectively connecting the aforesaid elements in series for storing energy in said electrical energy storing device at a substantially constant rate and for selectively excluding said source of unidirectional voltage in said series circuit.

15. An electrical circuit including a condenser, a source of voltage, rectifier means, a pentode thermionic tube, and connection means for connecting the aforesaid elements in series relationship to charge the condenser at a substantially uniform rate.

16. An electrical circuit including a condenser, a source of voltage, rectifier means, a pentode thermionic tube, connection means for connecting the aforesaid elements in series relationship to charge the condenser at a substantially uniform rate, and switch means in said connection means operable to selectively exclude said voltage source from said series relationship.

17. An electrical circuit comprising, an electrical energy storage device, a network having four arms and having first and second terminals, and means for connecting said network terminals in series with said energy storage device, said network including unidirectional current passing means and substantially constant current passing means, said aforementioned series connection providing a path for current through at least a part of said unidirectional current passing means and at least a part of said substantially constant current passing means to release energy stored in said energy storage device.

18. An electrical circuit comprising, an electrical energy storage device, a voltage source, a network having four arms and having first and second terminals, and means for connecting said network terminals in series with said energy storage device and said voltage source, said network including unidirectional current passing means and substantially constant current passing means, said aforementioned series connection providing a path for current through at least a part of said unidirectional current passing means and at least a part of said substantially constant current passing means to store energy in said electrical energy storage device.

19. An electrical circuit comprising, an electrical energy storage device, a voltage source, a network having four arms and having first and second terminals, and means including switch means for connecting said network terminals in series with said energy storage device and said voltage source, said network including unidirectional current passing means and substantially constant current passing means, said aforementioned series connection providing a path for current through at least a part of said unidirectional current passing means and at least a part of said substantially constant current passing means to store energy in said electrical energy storage device, and said switch means being operable for excluding said voltage source from said series connection to release the stored energy in said energy storage device through at least a part of said unidirectional current passing means and at least a part of said substantially constant current passing means.

20. An electrical circuit comprising, an electrical energy storage device, a voltage source, a network having two different paths between input terminals, and means including switch means for connecting said input terminals in series with said electrical energy storage device and said voltage source, said network including unidirectional current passing means and substantially constant current passing means in at least one of said paths for passing current between said input terminals to store energy in said energy storage device, and said switch means being operable for excluding said voltage source from said series connection to release the energy stored in said energy storage device through said network.

21. An electrical circuit comprisign, a condenser, a unidirectional voltage source, a four-terminal network having first and second pairs of terminals, and means including switch means for connecting said first pair of network terminals in series with said condenser and said voltage source, said network including rectifier means and thermionic pentode means for passing current between said first pair of terminals and through at least one of said second pair of terminals to charge said condenser, and said switch means being operable for excluding said voltage source from said series connection to discharge said condenser through said network.

JAY W. PICKING.

REFERENCES CITED

The following references are of record in the file of this patent:

UNITED STATES PATENTS

| Number | Name | Date |
|---|---|---|
| 2,377,757 | Clark | June 5, 1945 |
| 2,382,243 | Livingston | Aug. 14, 1945 |
| 2,426,256 | Zenor | Aug. 26, 1947 |

Certificate of Correction

Patent No. 2,505,688 April 25, 1950

JAY W. PICKING

It is hereby certified that errors appear in the printed specification of the above numbered patent requiring correction as follows:

Column 6, line 68, for the word "change" read *charge*; column 7, line 52, for "unidirection" read *unidirectional*; column 10, line 70, for "comprisign" read *comprising*;

and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*